Feb. 17, 1970     F. J. SLOAN     3,495,504
METHOD OF PRODUCING PLASTIC SHEET PACKAGES
Filed Feb. 28, 1966     3 Sheets-Sheet 1

INVENTOR.
FRANCIS J. SLOAN
BY
ATTORNEY

Feb. 17, 1970     F. J. SLOAN     3,495,504
METHOD OF PRODUCING PLASTIC SHEET PACKAGES
Filed Feb. 28, 1966     3 Sheets-Sheet 2
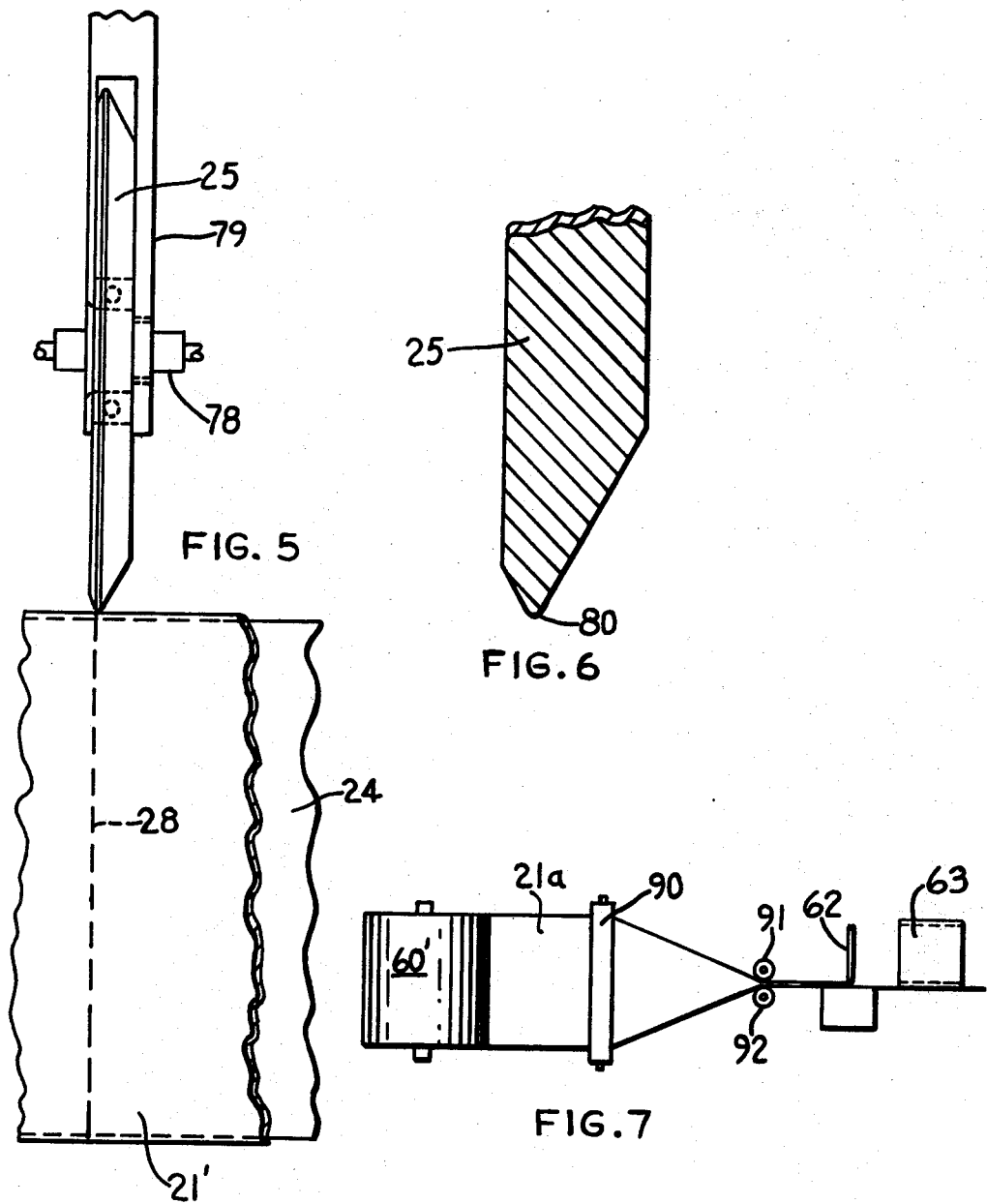
INVENTOR.
FRANCIS J. SLOAN
BY
ATTORNEY Feb. 17, 1970  F. J. SLOAN  3,495,504
METHOD OF PRODUCING PLASTIC SHEET PACKAGES
Filed Feb. 28, 1966  3 Sheets-Sheet 3
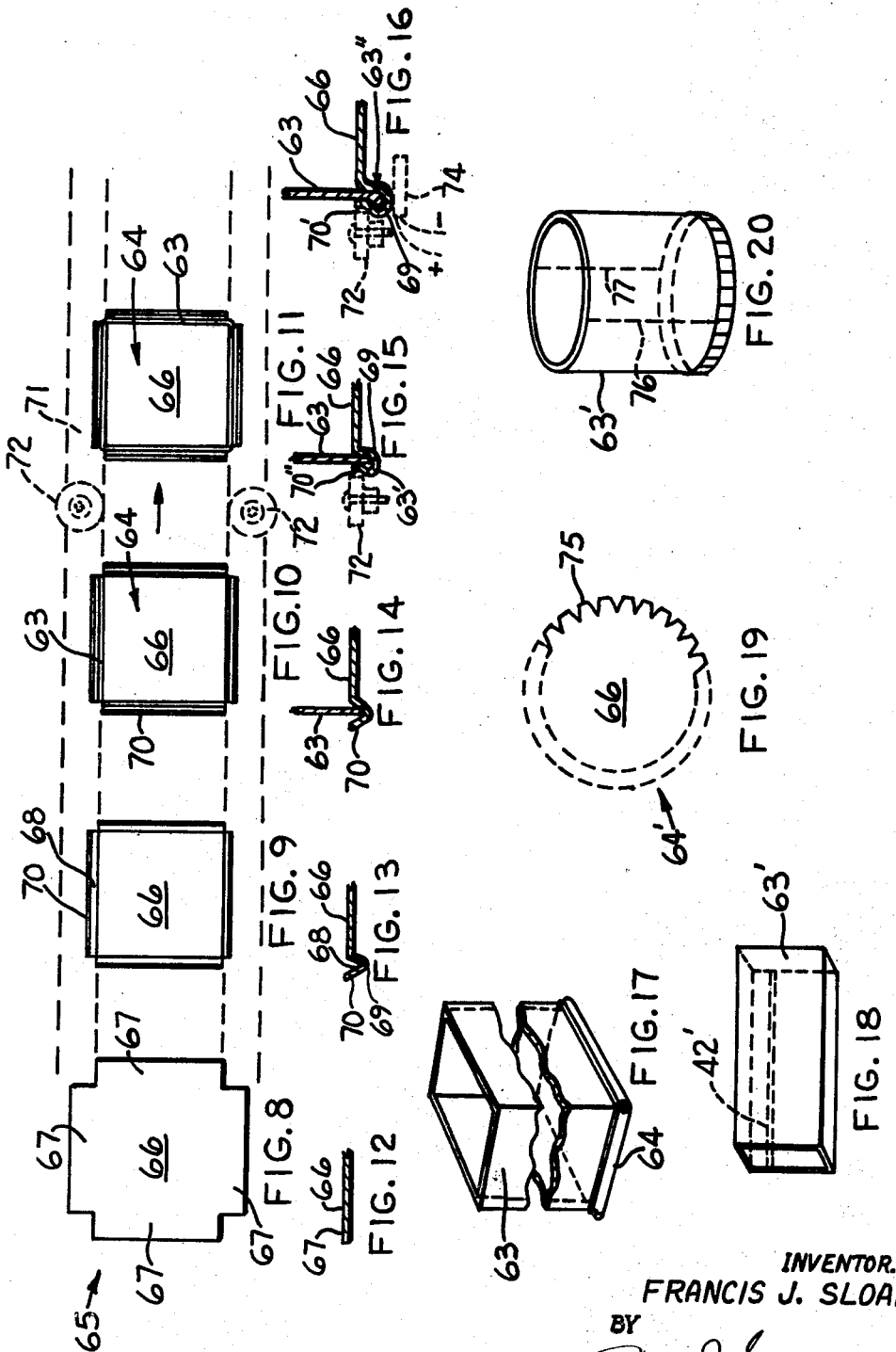
INVENTOR.
FRANCIS J. SLOAN
BY
ATTORNEY

United States Patent Office 3,495,504
Patented Feb. 17, 1970

3,495,504
METHOD OF PRODUCING PLASTIC SHEET PACKAGES
Francis J. Sloan, 211 Holly St., Cranford, N.J. 07016
Filed Feb. 28, 1966, Ser. No. 530,670
Int. Cl. B31b 17/74, 1/78
U.S. Cl. 93—55.1     8 Claims

ABSTRACT OF THE DISCLOSURE

A method of forming a plastic container including scoring roll lengths of the plastic material, folding and unfolding the scored material and placing an end cap on the formed geometric shape.

---

This invention relates to the production of rigid plastic sheet packaging material, particularly those of the transparent type, as well as the packages made by the process of the invention. More specifically, it deals with the manufacture, in continuous manner out of rigid plastic sheet, of a multi-scored and seam-sealed roll of container wall, which is processed in a novel manner and cut to required container lengths, and then provided with novel end covers which adequately hold the container walls intact, as well as serve to seal the container.

Among the objects of the present invention are the scoring, in continuous manner, of rigid plastic sheet, without heat or resilience, the prebreaking of scores continuously after the container walls are formed, the production of a roll of rigid prescored and pre-broken plastic container wall, and the application, crimping and heat-locking of end caps, particularly when the walls are made of thermoplastic material.

In recent years, rigid plastic sheet of the transparent variety has been formed into geometric container shapes. Such containers have the ends made out of the same material, in the form of flaps which are scored to enable covering the open end of the container and tucking in the end of the flap. Such containers have found considerable popular appeal because the goods sold, such as toothbrushes, dolls, brushes, and the like, are in open view to the purchaser, yet they are not subject to contamination and mutilation by handling. Containers of this type are expensive to make since each container must be individually cut and scored in both or more than two directions.

According to the present invention, transparent rigid plastic sheet containers are made continuously in wall form, after which the wall lengths are cut, and the end caps are attached in an inexpensive and convenient manner.

The process, in brief, resides in the following main operations:

(1) Scoring, without heat or resilience, of a continuous sheet of rigid plastic sheet fed from a roll; (2) forming a continuous enclosed container wall, by including seaming and breaking of certain scoring; (3) cutting the desired lengths of container wall fed from a roll, and using said lengths as packaging components, if desired; (4) forming the desired geometric shape from said cut wall length; (5) applying a rigid sheet cap at least on one end of the formed geometric shape; and/or (6) crimping the edges of said cap onto the open geometric shape edges, with or without the application of adhesive, heat, and the like, if desired.

The invention will be more readily understood by reference to the accompanying drawings in which a preferred embodiment is described, and in which the same numerals refer to similar parts in the various figures.

In the drawings.

FIGURE 1 depicts a schematic flowsheet, in side view, of the continuous process of feeding rigid plastic sheet from a roll, scoring said sheet, applying adhesive to an edge and seaming the sheet to produce an enclosed continuous container wall, breaking some of the scores, and rolling up the container wall onto a roll for further processing.

FIGURE 2 presents a top view of a portion of the stream flow taken along line 2—2 of FIGURE 1.

FIGURE 5 illustrates a more enlarged front view of a scoring wheel applying a score line onto a rigid plastic sheet passing over a metal drum of the present invention.

FIGURE 6 is a still more enlarged cross-sectional edge view of the scoring portion of one of the scoring wheels.

FIGURE 7 depicts a schematic side view of the container wall as it is fed from the roll, and broken, if desired, and then cut to desired lengths, and finally opened into a geometric form.

Figure 1:
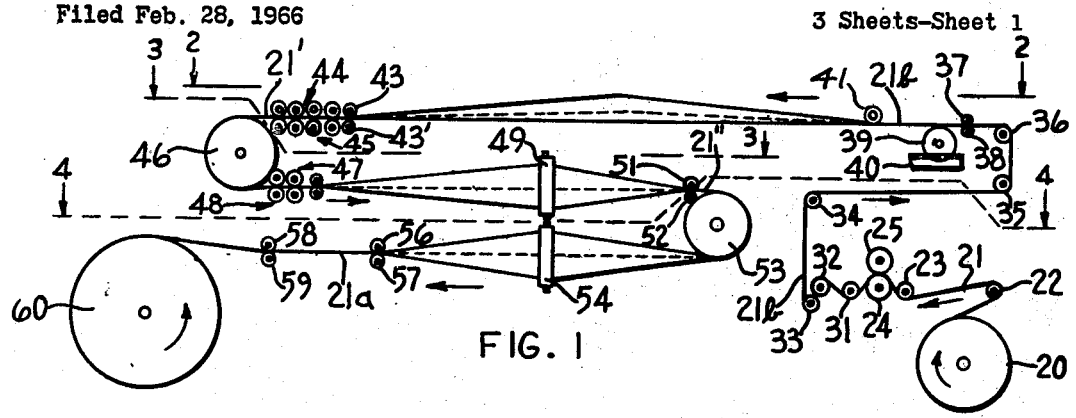

FIGURE 8 presents a top view of one type of cap blank as it is cut out of rigid sheet material.

FIGURE 9 illustrates the cap of FIGURE 8 with the edges grooved to take the open edges of the formed container wall.

FIGURE 10 shows the placement of a shaped container wall over the cap and in the grooves thereof.

FIGURE 11 illustrates the container wall with bottom cap crimped thereon.

FIGURES 12 to 15 show, respectively, the cross sections of the cap and wall portions at the joining area, as found in FIGURES 8 to 11, respectively.

FIGURE 16 shows a diagrammatic view, similar to those in FIGURES 12–15, wherein heat is applied to the joining area to form a locking bead when the wall material is made of thermoplastic sheet.

FIGURE 17 shows a perspective side view of a container of the present invention having a cap as applied by the process of FIGURE 15 or 16.

FIGURE 18 presents a perspective side view of a sleeve type of packaging which may be made according to the present invention.

FIGURE 19 depicts a top view of a blank for a cap for a container of the present invention made in round geometric form.

FIGURE 20 illustrates a perspective side view of a round container of the present invention having a cap, such as that depicted in FIGURE 19, grooved, and crimped onto one end thereof.

Referring again to the drawings, numeral 20 designates a roll of plastic sheet material, such as a roll of transparent bi-oriented polystyrene rigid sheet of, say, 0.0075" thickness. This rigid (i.e., self-supporting) sheet 21 is passed over brake tension feed control roll 22 and dancing roller 23, and over a hard metal drum 24, over which are superimposed a row of scoring wheels 25 which will be described in further detail. These scoring wheels are spaced the required distances apart to provide for an overlapping joint portion 26, and, since the container in this case is to be a square-shaped polygon, scoring lines 27, 28, 29 and 30 are cut into the surface of the plastic sheet. This scoring is effected by a combination of a cutting action plus a sidewise plastic flow effect due to the pressure exerted on the sheet.

After being scored, the scored sheet 21b is passed over idling roller 31, driven sheet puller roller 32, and idlers 33, 34, 35, and 36, and between guide rollers 37–38. Thereafter, seam area 26 passes over "glue" wheel 39 which has its lower surface dipped in container 40 carrying liquid cement which is applied by wheel 39 to the under surface of seam portion 26.

Thereafter, sheet 21b passes under roll 41, after which both sides are folded over to form a seam at 42, between rolls 43 and 43'. Long seam pressure rolls 44 disposed above and those (45) disposed below the seamed tube 21' serve to insure that seam 42' is tightly cemented.

After tube 21', which is really the seamed container wall or ribbon in continuously moving form, passes over roll 46 and between additional pressure rolls 47 and 48, the tube 21' is folded so that the previously two folded "corners" are now broken and open. It will be noted that when the continuous container wall 21' leaves rolls 49 and 50, the wall is refolded at opposite scoring lines 27 and 29. When the wall length is refolded, the folding takes place at opposite scoring lines 28 and 30, while the previous folds at scoring lines 27 and 29 are flattened out by passing the wall length or tubing between rolls 49 and 50. This breaking and flattening which takes place between rolls 49 and 50 can also be effected by parallel moving belts. Although these two rolls (or belts) are shown, it is to be understood that a number of pairs of rolls may be used in series in order to effect a gradual breaking and thus prevent misalignment of the sheet at the scoring, or buckling of adjacent panels.

After the broken corners have ben flattened the flat plastic tube 21" is passed between guide rollers 51 and 52 and over large roller 53, whereupon the corners are again broken between rollers 54 and 55. This rebreaking makes the finished container wall easier to manipulate when the ends are applied. Otherwise, the container wall would be stiffly out of shape and would require a greater amount of manipulation. This operation is optional and it depends on the nature of the plastic used. Thereafter, the finished packaging wall 21a is passed between rollers 56–57 and 58–59, and wound on wind-up roll 60. If it is desired to cut the formed packaging sleeve into lengths instead of rolling onto roll 60, a cutting unit, such as that shown in FIGURE 7, may be inserted between rolls 56–57 and 58–59.

After the packaging wall (sleeve) is made in roll form, it may be stored for later use, or it may be passed to the cutter unit, as shown in FIGURE 7. In this case, the roll 60' of sleeve packaging 21a is passed between rolls 90, after which it is opened to break the creases and folded to new oppositely-disposed creases. Thereafter, it passes between rolls 91 and 92 to flatten the previously folded creases, and is cut into the desired lengths 63 by cutter 62. The breaking action of rolls 91–92 enables the cut length 63 to pop up into approximately the hollow tetragonal geometric form desired. However, if the cut lengths are to be stacked and shipped, rolls 90–91–92 may be omitted, and the sleeving 21a may be cut directly as it leaves roll 60'.

Caps 64 are made of rigid sheet material, which may be plastic, heavy paper, metal, such as aluminum or iron, and the like. One method for their manufacture is shown in FIGURES 8–16. A typical end cap material may be hard aluminum sheet of 0.006" thickness, preferably stamped out in the form of a fat cross blank 65, having a center portion 66 and tabs or flaps 67, which protrude from each side. The flaps are then shaped to provide a groove 68 the lower portion 69 of which is disposed below the level of center portion 66. The outer boundary 70 of the groove projects outwardly at a slight angle of, say, 20°–30°, preferably 30° for good nesting characteristics, as in FIGURES 9 and 13. The caps then are ready to be applied to the wall portion 63.

The wall portion 63 is set in grooves 68, as in FIGURES 10 and 14, and thereafter, the container 63, disposed over cap 64, is passed on a conveyor 71 having crimping wheels or tungsten plows 72, whereby projecting edges 70 of tabs 67 are bent and forced into tight relationship against the container walls 63. It will be noted that edges 63' of walls 63 are thus firmly held in place by the crimped edge 70', as shown in FIGURES 11 and 15. If a thermoplastic material is employed in forming walls 63, it is possible, and often desirable to form a locking engagement for cap 64. As tab edge 70 is being crimped by wheel 72, the container passes over a heater element 74 disposed under the flaps, which heats the container wall edge 63' to its softening or de-orientation point. This heating may also be effected before or after the crimping operation. This causes the plastic to form a receding ball or bead 63" which is a self-controlling action, characteristic of bioriented plastics, and which makes it very difficult to slip cap 64 from walls 63. This bead, when formed, impresses an additional spring effect in aiding the fastening of the container edge to the cap. Although the arrangement with conveyor 71 enables crimping and anchoring only two opposite flaps of the cap, the container may be turned around and passed through the conveyor to effect the same action on the other two flaps.

Once the bottom cap is applied, the contents of the container are inserted therein, and the top cap is applied in a similar manner, except that it is more convenient, and often desirable, to employ an upper convoyer, so as to avoid overturning the container and its contents. Of course, both ends could also be simultaneously capped.

Figure 2:
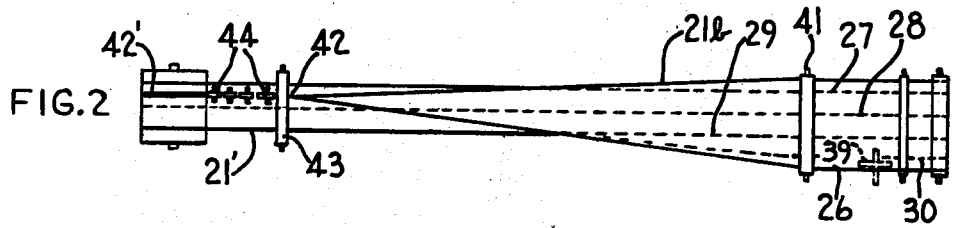
Figure 3:
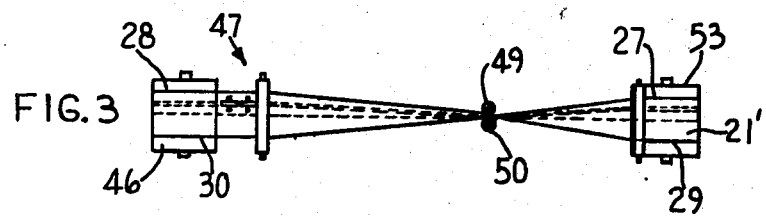
FIGURE 3 illustrates a top view of a portion of the stream flow taken along the line 3—3 of FIGURE 1.
Figure 4:
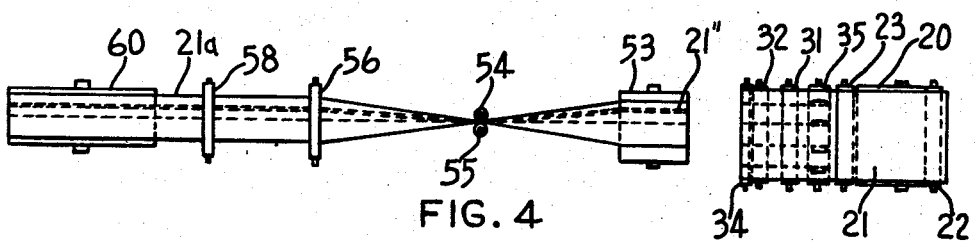
FIGURE 4 shows a top view of a portion of the stream flow taken along line 4—4 of FIGURE 1.

Although a square or rectangular container is depicted in the drawings of FIGURES 1–18, it is to be understood that other shapes are possible, depending upon the shape desired, it being understood that at least two oppositely disposed scoring lines be present in the rolled and finished continuous flat container wall. When two score lines are employed an ovate or cylindrical container can be manufactured, as shown in FIGURES 19 and 20. The cap 64' has dentate or contoured type tabs or flaps 75 around the central portion 66. The container wall 63' has two scored lines 76 and 77. When the cut container wall length 63' is opened and arced, as in FIGURE 20, the edges thereof may be inserted in grooves 68 formed in flaps 75, and the projecting edges 70 of the grooved flaps may be crimped by a wheel, or other means, to produce a cylindrical container.

Details of the scoring process employed herein are given in FIGURES 5–6. It will be noted that the scoring is not done in the conventional manner by use of a resilient backing and/or the application of heat. A scoring wheel 25 is employed, which wheel rotates on spindle 78. The latter is adjustably mounted on a base 79. The wheel is provided with a dull pointed edge 80 which has a desired radius of about 0.005" to about 0.030", for plastic sheets of about 0.005" to 0.010" thickness. For thicker sheets, a greater radius may be desired. As plastic sheet 21' passes over the hard surfaced drum, such as a chromium-plated steel drum 24, wheel edge 80 is adjusted so as to make a score 28 into about ⅕ to ½ of the thickness of the sheet. Scoring in this manner has been found to prevent fracture of the sheet, particularly during the fold breaking operations.

As stated previously, the sleeving 21a may be used directly, in cut lengths, as packaging material, such as that shown in FIGURE 18. Here, the sleeve 63', having seam 42', may be used as a cover for articles or may be used as a transparent receptacle for a paper drawer which may be slipped into it. The seam may be made as a lap joint which is cemented, glued, heat-sealed, or otherwise secured. Or, it may be a butt joint joined by tape, or the like, the seam type depending upon the plastic used and the type of container to be made.

Although a cap such as that shown in FIGURES 8–11 has been described, it is understood that other caps may be applied to the geometrically-shaped sleeve, such as a conventional sheet cap having a lipped edge which slips over the side of the container sleeve.

In the cases where more than four score lines are used, the breaking rolls may be used to break continuously, additional pairs of scores to insure breakage of all scores which are to be broken, depending on the geometric shape (e.g. octagonal) to be made.

The example given shows the scoring as disposed inside the enclosed geometric shape. However, it is sometimes desirable to form a shape wherein some or all of the scoring lines are disposed outside, particularly when gussets are to be provided in the shape, or when the plastic thickness, or the type of plastic employed, or the packaging use, make it desirable to employ such scoring location.

Although the geometric shapes have been shown as capped at right angles to the walls, it is to be understood that the shape ends may be cut at various angles, depending upon the ultimate result desired.

I claim:
1. A process for continuously producing a flat tubular ribbon convertible into cut geometrically-shaped hollow containers from a roll length of rigid plastic sheet, comprising:

scoring said sheet longitudinally and continuously over a hard rigid surface with a non-driven dull-pointed blade to form at least two continuous longitudinal hinging scoring lines thereon, folding said sheet inwardly and flattening same continuously at two scoring lines, and sealing the free longitudinal edges of said folded sheet to form a flat tubular ribbon.

2. A process according to claim 1 in which the flat tubular ribbon is rolled into a roll.

3. A process, according to claim 2, in which the flat tubular ribbon is cut into desired lengths, opening said cut lengths into geometric forms, and attaching a rigid metal sheet cap over at least one open end of each form.

4. A process according to claim 1, in which said sheet is scored longitudinally with a multiplicity of scoring lines, two of which lines serving as oppositely-disposed folding lines for said sheet.

5. A process, according to claim 4, in which the ribbon, prior to rolling up, is opened continuously at least once to break the folded scoring lines and folded until the newly-opened areas of the ribbon abut each other, the ribbon then is continuously folded and opened at least once at two new scoring lines, and the ribbon is refolded at the original scoring lines as after sealing.

6. A process, according to claim 5, in which the scoring is done by a non-yielding non-driven dull-pointed scoring wheel over a non-yielding rigid hard metal roll without the application of heat.

7. A process, according to claim 5, in which the ribbon is cut to the desired size, opened, and at least one end of said opened hollow geometric form is placed on a flat sheet metal cap having a groove positioned and aligned with the edge of said end, and crimping the outer edge of said cap groove firmly against said form edge disposed within said groove.

8. A process, according to claim 7, in which said crimped cap edge is contacted with a heating means for a time and a temperature sufficient to melt the form edge into a thicker seam serving as locking means within said crimped cap edge.

References Cited
UNITED STATES PATENTS

| 709,502 | 9/1902 | Munson | 93—53 |
| 2,019,499 | 11/1935 | Maher. | |
| 2,024,013 | 12/1935 | Sidebotham | 93—58.1 XR |
| 3,067,653 | 12/1962 | Lesser et al. | 93—39.1 |
| 3,202,066 | 8/1965 | Palmer | 93—58.1 XR |

BERNARD STICKNEY, Primary Examiner

U.S. Cl. X.R.

93—58.1, 39.1; 161—69